(12) United States Patent
Subber et al.

(10) Patent No.: US 12,189,725 B2
(45) Date of Patent: Jan. 7, 2025

(54) APPARATUS, METHOD, AND COMPUTER PROGRAM PRODUCT FOR MULTI-CLASS CLASSIFICATION USING ADAPTED TWO-LEVEL BINARY CLASSIFICATION MODELS

(71) Applicant: Honeywell International Inc., Charlotte, NC (US)

(72) Inventors: Waad Subber, Niskayuna, NY (US); Ankit Singh, Apex, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/332,905

(22) Filed: Jun. 12, 2023

(65) Prior Publication Data
US 2024/0411839 A1   Dec. 12, 2024

(51) Int. Cl.
*G06F 16/906* (2019.01)
*G06F 18/2431* (2023.01)

(52) U.S. Cl.
CPC ........ *G06F 18/2431* (2023.01); *G06F 16/906* (2019.01)

(58) Field of Classification Search
None
See application file for complete search history.

(56) References Cited

U.S. PATENT DOCUMENTS

| | | | | |
|---|---|---|---|---|
| 2020/0193153 A1* | 6/2020 | Lee | ........................ | G06N 20/00 |
| 2020/0356813 A1* | 11/2020 | Sharma | ................ | G06F 16/906 |
| 2022/0122261 A1* | 4/2022 | Ezhov | ................... | G06F 16/906 |
| 2022/0237801 A1* | 7/2022 | Kaufman | ............... | G06N 20/00 |
| 2023/0139437 A1* | 5/2023 | Nicacio Braga | ........ | G06F 16/90 |
| 2023/0342691 A1* | 10/2023 | Rapowitz | ............... | G06N 20/00 |

* cited by examiner

*Primary Examiner* — Son T Hoang
(74) *Attorney, Agent, or Firm* — ALSTON & BIRD LLP

(57) ABSTRACT

A multi-class classification system performs multi-class classification using an adapted, multi-level binary classification model in conjunction with pre-classification and post-classification processing. Original, multi-class training data is transformed into coarse-level adapted training data and fine-level adapted training data. In the coarse-level adapted training data, objects from the original training set are classified into either a majority classification set (representing the largest original classification set) or a non-majority classification set representing a combination of the remaining classification sets from the original training data. In the fine-level adapted training data, objects from the non-majority classification set retain their original classifications from the original training data. The adapted training data is used to train coarse-level and fine-level instances of the binary classification model, which are used to generate coarse-level and fine-level binary classifications of objects with respect to an input data set. The binary classifications are transformed into a multi-class classification.

16 Claims, 5 Drawing Sheets

APPARATUS, METHOD, AND COMPUTER PROGRAM PRODUCT FOR MULTI-CLASS CLASSIFICATION USING ADAPTED TWO-LEVEL BINARY CLASSIFICATION MODELS

TECHNICAL FIELD

Embodiments of the present disclosure generally relate to machine learning classification models, and specifically, in some examples, to machine learning models for multi-class classification of quality management events.

BACKGROUND

Applicant has identified example technical challenges and difficulties associated with machine learning models for multi-class classification. Through applied effort, ingenuity, and innovation, Applicant has solved problems relating to machine learning models for multi-class classification.

BRIEF SUMMARY

According to one aspect, example embodiments of the present disclosure include an apparatus comprising at least one processor and at least one non-transitory memory comprising program code stored thereon. The at least one non-transitory memory and the program code are configured to, with the at least one processor, cause the apparatus to at least: transform an original training data set corresponding to a multi-class classification task into at least two adapted training data sets each corresponding to a binary classification task, the at least two adapted training data sets including a coarse-level adapted training data set and at least one fine-level adapted training data set, wherein a coarse-level instance of a binary classification model configured to perform the binary classification task is trained based at least in part on the coarse-level adapted training data set, and at least one fine-level instance of the binary classification model is trained based at least in part on, respectively, each at least one fine-level adapted training data set; transform binary output data generated with respect to an input data set using the trained coarse-level instance of the binary classification model and the trained at least one fine-level instance of the binary classification model into multi-class output data corresponding to the multiclass classification task; and cause performance of at least one enterprise management operation based at least in part on the multi-class output data.

In some embodiments, the original training data set comprises a multi-class classification of training objects each into an original classification set of at least three original classification sets. Moreover, in some embodiments, the coarse-level adapted training data set comprises a binary classification of the training objects from the original training data set each into one of: a majority classification set corresponding to a particular original classification set of the at least three original classification sets into which a largest proportion of the training objects are classified in the original training data set relative to other original classification sets of the at least three original classification sets; and a non-majority classification set representing a combination of the other original classification sets of the at least three original classification sets other than the particular original classification set to which the majority classification set corresponds. Additionally, in some embodiments, the at least one fine-level adapted training data set each comprises a binary classification of a selected subset of the training objects, including only training objects classified into the non-majority classification set in the coarse-level adapted training data set, each into one of a first classification set and a second classification set, each of which corresponds to a different original classification set from among the combination of original classification sets represented by the non-majority classification set of the coarse-level adapted training data set.

Additionally or alternatively, a coarse-level portion of the binary output data, which coarse-level portion is generated using the trained coarse-level instance of the binary classification model, comprises a binary classification of all production objects from the input data set each into one of: the majority classification set and the non-majority classification set. A fine-level portion of the binary output data, which fine-level portion is generated using the trained at least one fine-level instance of the binary classification model, comprises a binary classification of a selected subset of the production objects including only production objects classified into the non-majority classification set in the coarse-level portion of the binary output data each into a particular original classification set from among the combination of original classification sets represented by the non-majority classification set.

In some embodiments, the at least one non-transitory memory and the program code are configured to, with the at least one processor, further cause the apparatus to at least: train the coarse-level instance of the binary classification model based at least in part on the coarse-level adapted training data set; and train each at least one fine-level instance of the binary classification model based at least in part on, respectively, each at least one fine-level adapted training data set.

In some embodiments, the at least one non-transitory memory and the program code are configured to, with the at least one processor, further cause the apparatus to at least: generate the binary output data with respect to the input data set using the trained coarse-level instance of the binary classification model and the trained at least one fine-level instance of the binary classification model. In some embodiments, generating the binary output data and transforming the binary output data into the multi-class output data comprises: generating a coarse-level portion of the binary output data by performing, using the trained coarse-level instance of the binary classification model, a coarse-level classification of all production objects from the input data set into one of the majority classification set and the non-majority classification set; generating a fine-level portion of the binary output data by performing, using the trained at least one fine-level instance of the binary classification model, a fine-level classification of a selected subset of the production objects including only production objects classified into the non-majority classification set in the coarse-level portion of the binary output data; and combining the coarse-level portion of the binary output data and the fine-level portion of the binary output data to produce the multi-class output data.

In some embodiments, the multi-class classification task includes classification of text objects containing text characterizing quality management events associated with products produced by an enterprise into classification sets corresponding to predicted levels of severity of the quality management events.

According to another aspect, embodiments of the present invention feature a method comprising: transforming an original training data set corresponding to a multi-class classification task into at least two adapted training data sets each corresponding to a binary classification task, the at least two adapted training data sets including a coarse-level adapted training data set and at least one fine-level adapted training data set, wherein a coarse-level instance of a binary classification model configured to perform the binary classification task is trained based at least in part on the coarse-level adapted training data set, and at least one fine-level instance of the binary classification model is trained based at least in part on, respectively, each at least one fine-level adapted training data set; transforming binary output data generated with respect to an input data set using the trained coarse-level instance of the binary classification model and the trained at least one fine-level instance of the binary classification model into multi-class output data corresponding to the multiclass classification task; and causing performance of at least one enterprise management operation based at least in part on the multi-class output data.

According to another aspect, embodiments of the present invention feature a computer program product comprising at least one non-transitory computer-readable storage medium having computer-readable program code portions stored therein. The computer-readable program code portions comprise an executable portion configured to: transform an original training data set corresponding to a multi-class classification task into at least two adapted training data sets each corresponding to a binary classification task, the at least two adapted training data sets including a coarse-level adapted training data set and at least one fine-level adapted training data set, wherein a coarse-level instance of a binary classification model configured to perform the binary classification task is trained based at least in part on the coarse-level adapted training data set, and at least one fine-level instance of the binary classification model is trained based at least in part on, respectively, each at least one fine-level adapted training data set; transform binary output data generated with respect to an input data set using the trained coarse-level instance of the binary classification model and the trained at least one fine-level instance of the binary classification model into multi-class output data corresponding to the multiclass classification task; and cause performance of at least one enterprise management operation based at least in part on the multi-class output data.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
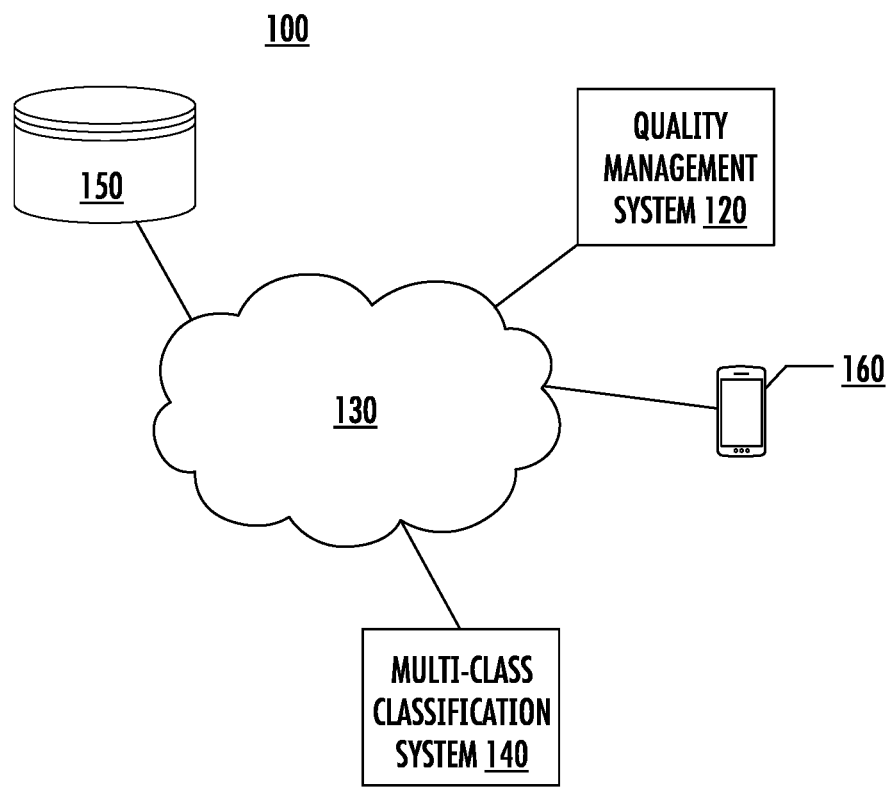
Figure 2:
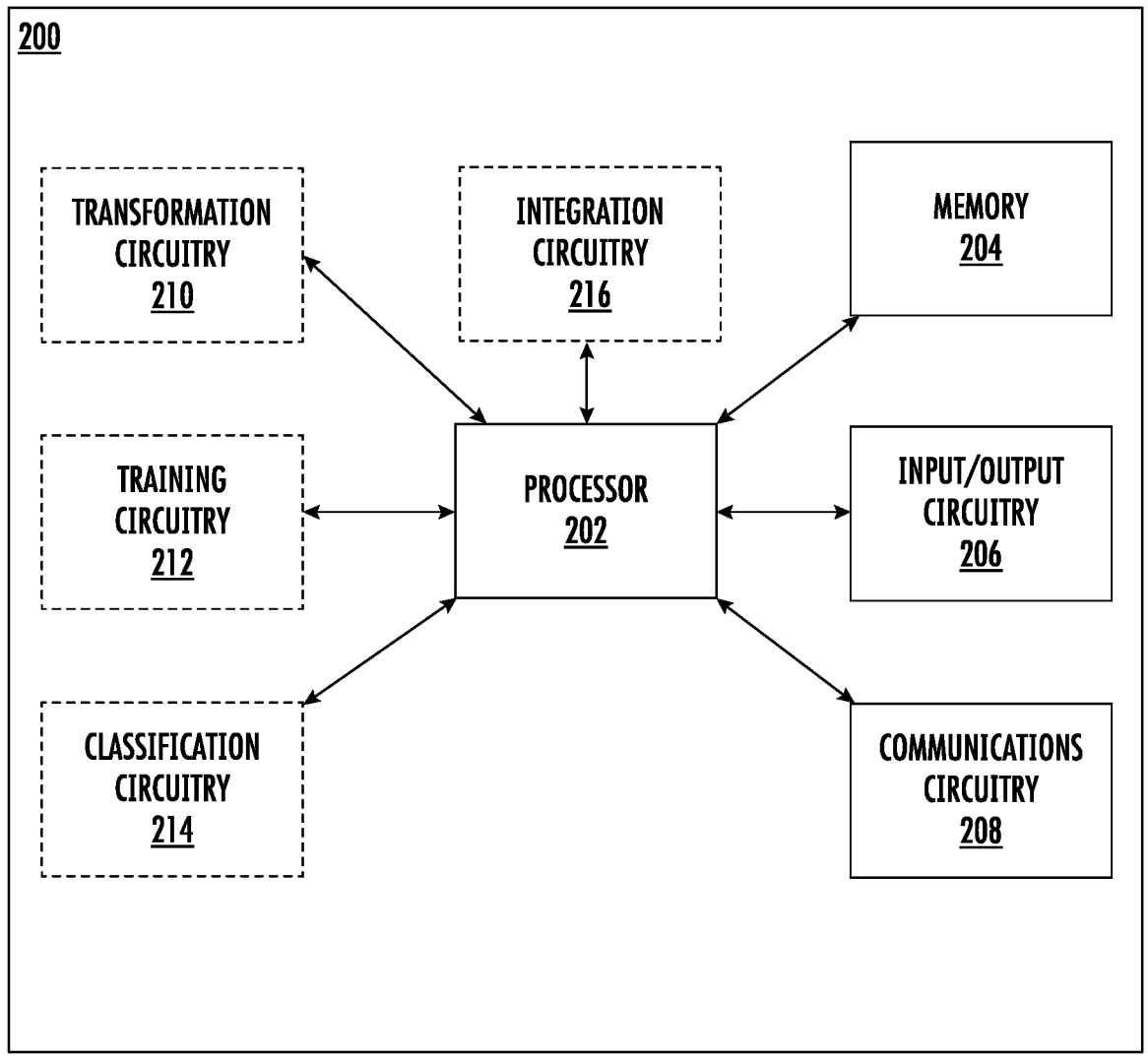
Figure 3:
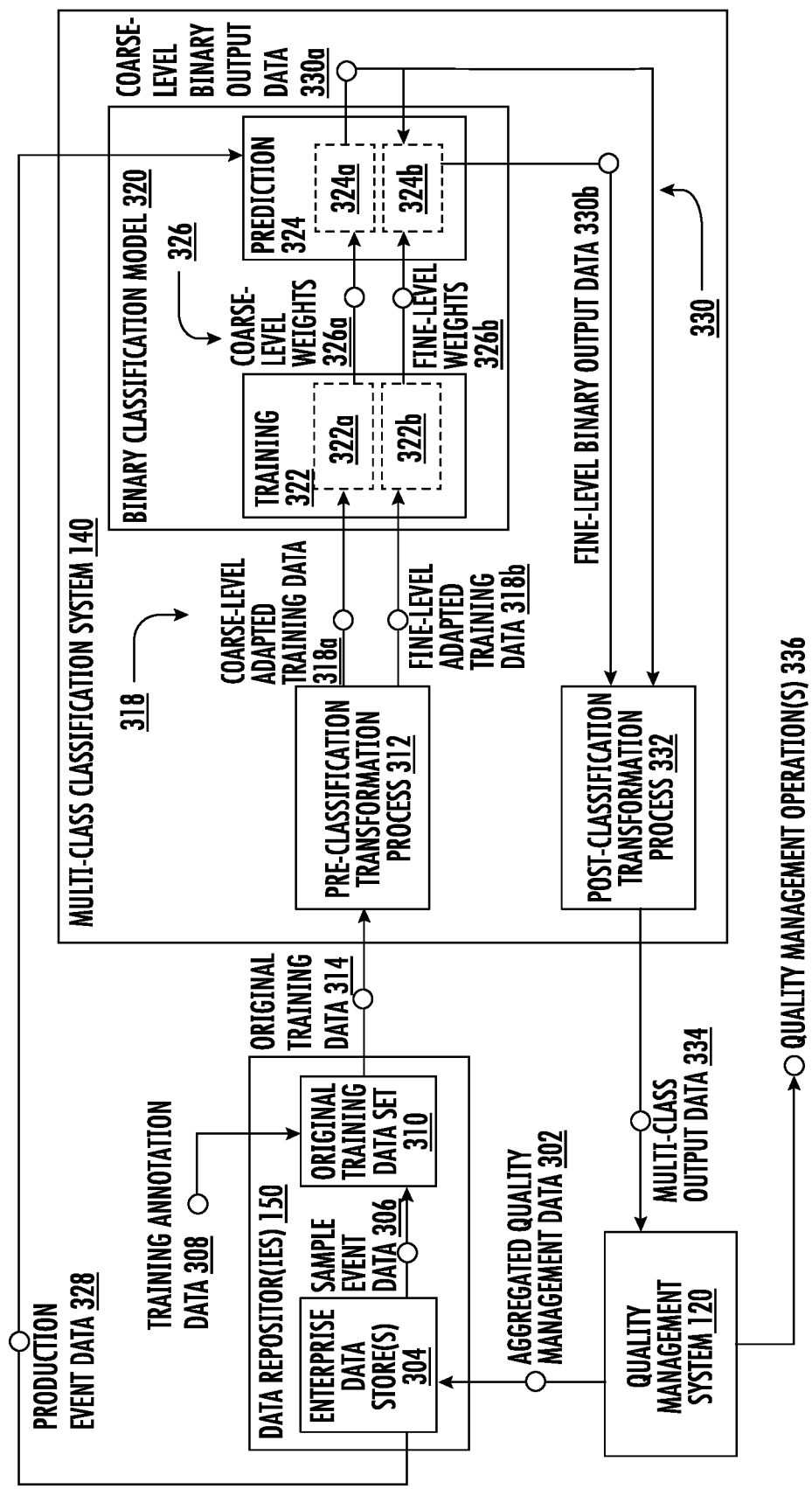
Figure 4:
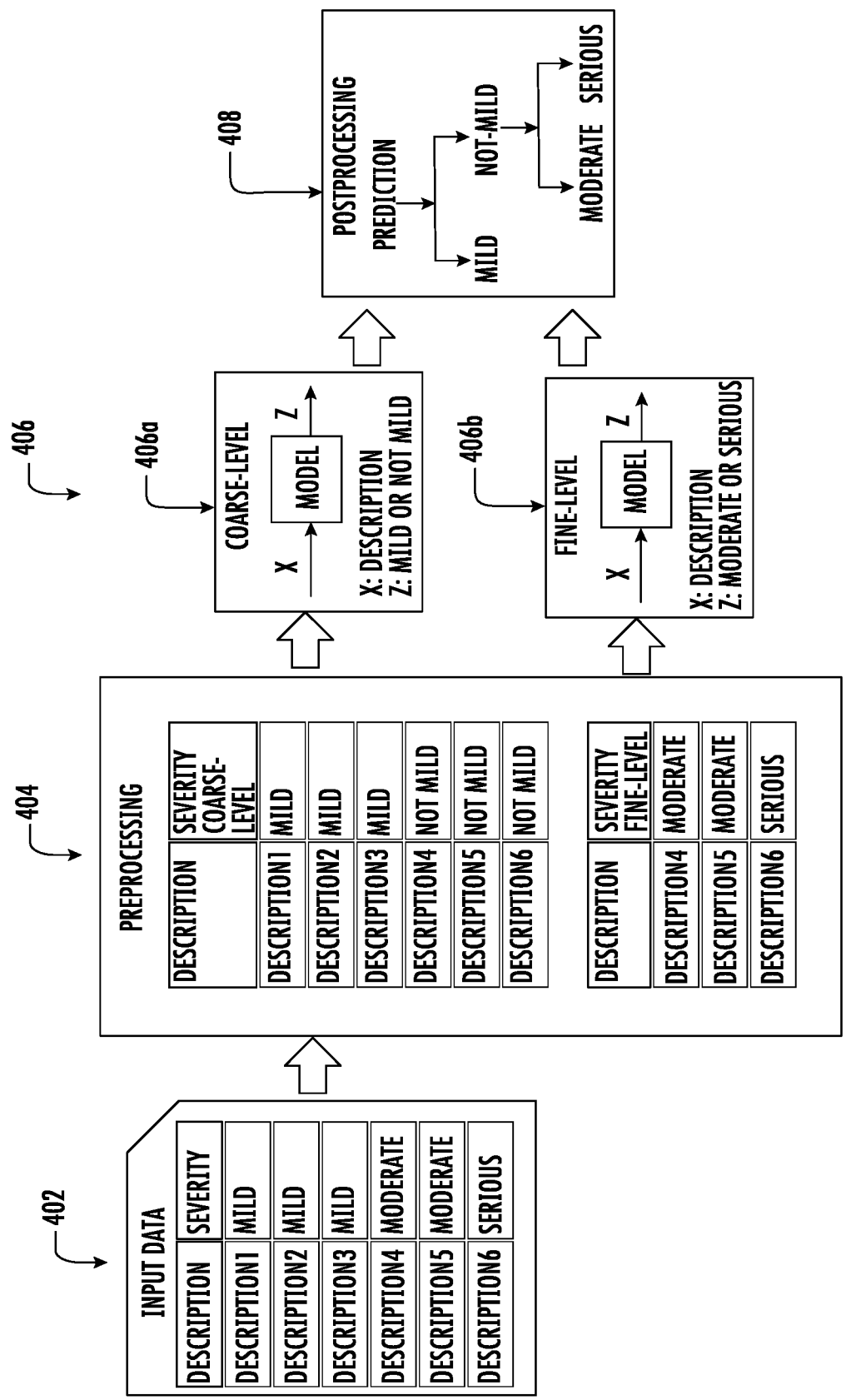
Figure 5:
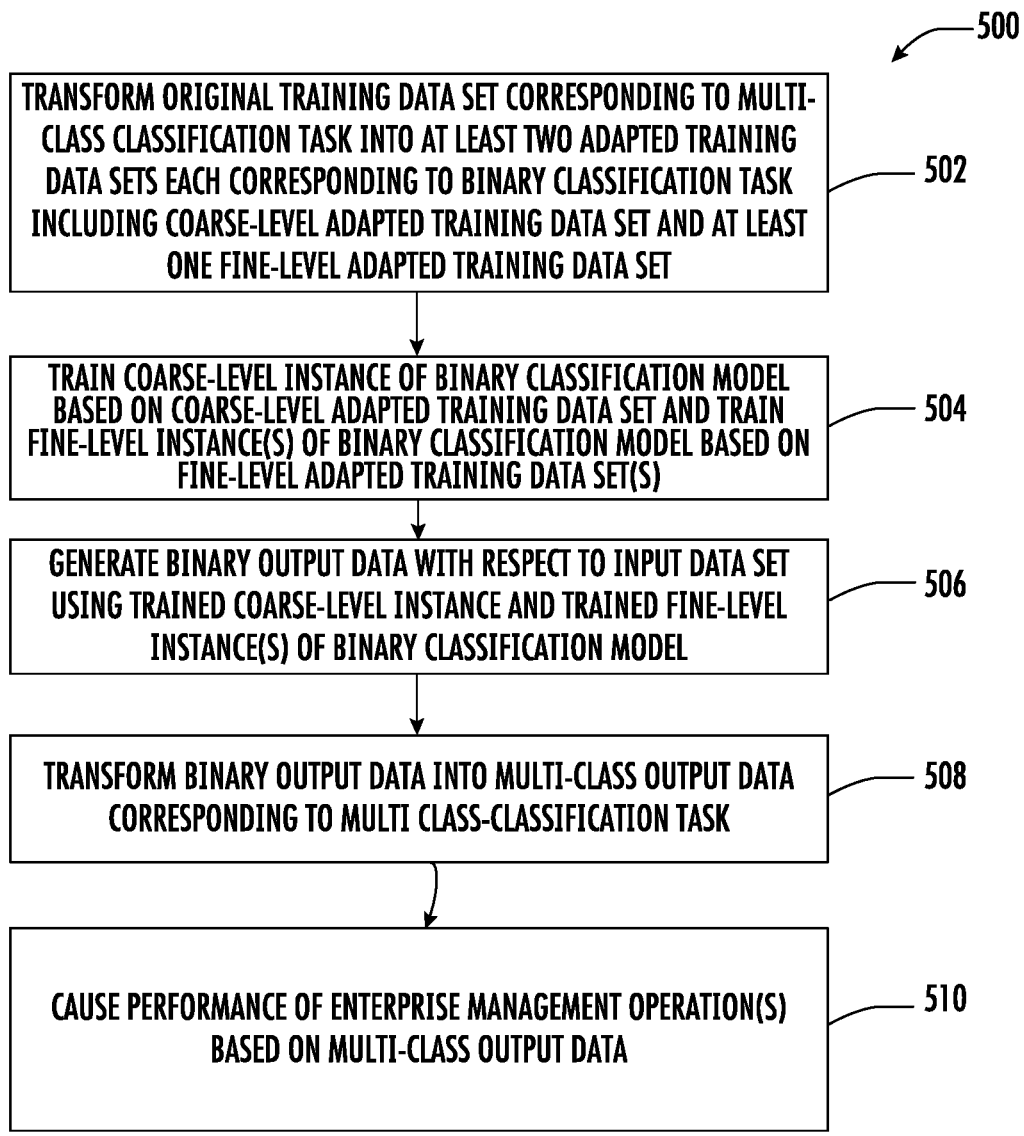

Having thus described the embodiments of the disclosure in general terms, reference now will be made to the accompanying drawings, which are not necessarily drawn to scale, and wherein:

FIG. 1 illustrates an exemplary block diagram of an environment in which embodiments of the present disclosure may operate;

FIG. 2 illustrates an exemplary block diagram of an example apparatus that may be specially configured in accordance with an example embodiment of the present disclosure;

FIG. 3 illustrates an exemplary multi-class classification system, in accordance with at least some example embodiments of the present disclosure;

FIG. 4 illustrates example data objects used by and produced by a multi-class classification system at various stages, in accordance with at least some example embodiments of the present disclosure; and FIG. 5 is a flowchart depicting an example process for performing multi-class classification using an adapted, multi-level binary classification model, in accordance with at least some example embodiments of the present disclosure.

DETAILED DESCRIPTION

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

Machine learning systems have been proposed to solve classification problems within various contexts and with respect to various subject matter domains. In these classification problems, in some examples, objects represented in data are classified into categories based on features of the data associated with the objects being classified. For the purpose of illustration, in some examples, text objects containing various discrete textual descriptions may be classified into categories based on features of the text objects such as the presence of certain words in the text, patterns in how certain words or types of words are arranged with respect to each other, semantic and/or numeric characteristics derived from the text, and/or various data and/or metadata attributes associated with the text objects, among other examples. A (e.g., annotated) training data set comprising sample text objects each associated with classification labels may be used (e.g., in conjunction with a machine learning algorithm) to develop, define, and/or train a classification model capable of classifying unlabeled and/or unclassified text objects of a given input data set into the various categories (or classification sets) reflected in the training data set.

Types of classification problems to which these machine learning systems may be directed include multi-class classification and binary classification, to name a few examples. In multi-class classification, a given object may be classified into exactly one classification set from among at least three classification sets. On the other hand, in binary classification, a given object may be classified into exactly one classification set from among exactly two classification sets.

In some exemplary, domain-specific scenarios, enterprises such as businesses or other organizations may produce products (e.g., manufactured goods, provided services) of various types via various research, development, manufacturing, distribution, and/or service provision processes associated with production of these products. In many such cases, these enterprises may develop, implement, and/or perform quality management systems, processes, and/or operations with respect to these research, development, manufacturing, distribution, and/or service provision processes with an aim toward ensuring that the quality of the products being produced meet a certain standard at a certain level of consistency. Sometimes, certain aspects of such quality management may even be required by laws and/or regulations, and some quality management systems, processes, and/or operations may be devised and/or configured to ensure that research, development, manufacturing, distribution, and/or service provision processes associated with production of these products are in compliance with applicable laws and/or regulations. Quality management may be especially important with respect to production of certain types of products in particular, including medical devices, pharmaceutical products, and/or medical or life sciences services. For example, these products may be subject to a relatively high degree of quality management regulation.

Quality management software systems (also referred to herein as quality management systems) may be used to implement and/or facilitate quality management measures undertaken by enterprises with respect to the production of their products. More particularly, in one example, it may be possible for a quality management system to facilitate the process of receiving, generating, and/or aggregating any data associated with production of products that is required for quality management purposes. A quality management system may be configured to log quality management events based on input from various sources, including possibly internal enterprise data associated with production of the relevant products, data generated and/or received in connection with provision or use of the relevant products, and/or data characterizing and/or derived from communications with various entities associated with production, consumption, and/or use of the relevant products. In one example, the system may be configured to enable users to generate and fill out various types of forms associated with quality management, including complaint forms, supplier quality management forms, audit forms, risk forms, and/or quality event forms, to list a few examples. This data may be collected, archived, and consulted in order to provide visibility into various quality management objectives and/or operations with respect to the various research, development, manufacturing, distribution, and/or service provision processes subject to quality management and/or to initiate and/or cause performance of various quality management operations with respect to the processes in question. In some examples, quality management systems may be configured to present status data and/or generate and present insights (e.g., predictions and/or recommendations) for optimizing development and performance of quality management operations. These insights are often generated using machine learning models, which may be developed, configured, and/or trained using one or more machine learning algorithms.

Some of the data that may be collected by quality management systems (e.g., quality management events) may comprise text, including, for example, text characterizing how products were provided, consumed, and/or used, text characterizing particular contexts in which products were provided, consumed, and/or used, and/or text characterizing certain effects resulting from provision, consumption, and/or use of the products, among other examples. Text objects (e.g., comprised by quality management events) may contain text that represents and/or describes customer complaints arising from provision, consumption, and/or use of the products subject to quality management by the quality management system. In certain domains or contexts, it may be valuable or useful to perform classification tasks with respect to these text objects. In one example, it may be beneficial for a quality management system to classify each of these text objects into predicted levels of severity of the situations, events, and/or conditions described in the text of the text objects such as mild, moderate, and serious. In this case, it may be possible for a quality management system to be configured to perform a multi-class classification (e.g., using machine learning models and/or algorithms) with respect to the text objects and the severity level categories, assigning to each text object exactly one classification label corresponding to one of the levels of severity (e.g., mild, moderate, serious). For the purpose of illustration, in one example, text from a quality management event describing symptoms that are known to be associated with serious health conditions (e.g., critical conditions, potentially life- or limb-threatening conditions, conditions for which treatment is urgent or time-sensitive, conditions associated with high levels of risk for individuals and/or other related entities). Thus, for example, quality management data may be enhanced as a result of this multi-class classification, as severity levels of a particular text object can be automatically determined and associated with the text (or quality management event containing the text), which associations may aid in further analysis and/or interpretation of the data, performance of quality management operations in connection with the data, and/or prioritization and/or triage of intervention and/or amelioration with respect to provision of products.

However, existing approaches to multi-class classification present a number of challenges. Often, training data sets used to train a multi-class classification model may include imbalances inherent to the underlying contents of the data. For example, a proportion of quality management events that would be considered to have a mild severity level (e.g., and labeled as such in a training data set) may be significantly larger relative to events with a moderate or serious severity level (e.g., by virtue of most of the underlying events being mild in nature). Put another way, in an imbalanced training data set, there may be classes or classification sets with a very small frequency compared to other classes with high frequency in the data, resulting in the largest population of the data being classified into a majority class and smaller populations constituting the remaining, non-majority classes. Such imbalanced training data may cause training algorithms to spend an excessive proportion of time learning from a majority class and not learning enough from non-majority classes. As a result, an imbalanced training data set may reduce accuracy of a classification model with respect to these non-minority classes. Moreover, gathering or generating enough training data to ensure sufficient accuracy of classification with respect to non-majority classes may itself be excessively time-consuming and/or resource-intensive or may result in a training process that is excessively time-consuming and/or resource-intensive. In some instances, these drawbacks may render multi-class classification with respect to imbalanced data impractical or even impossible.

Some solutions have been proposed to address imbalanced training data for multi-class classification models. For example, in classification problems, imbalanced data has often been addressed using specialized resampling techniques for over or under sampling, applying weights to the classes, and by using specialized cost functions. However, these solutions have focused primarily or even exclusively on a single minority class making up the lowest proportion of the data, failing to adequately address intermediate non-majority classes that may respectively make up a larger proportion of the data than the minority class but still may constitute a significantly smaller proportion of the data than the majority class.

In various embodiments, the presently disclosed multi-class classification system is configured to perform a multi-class classification task using an adapted, multi-level (e.g., two-level) binary classification model in conjunction with pre-classification and post-classification processing and data transformation steps. More particularly, in one example, an original training data set corresponding to a multi-class classification task is transformed into at least two adapted training data sets, including a coarse-level training data set in which any individual non-majority classification sets are combined and at least one fine-level set in which only non-majority classification sets are reflected. A coarse-level instance of a binary classification model is then trained using the coarse-level training data, and at least one fine-level instance of the binary classification is trained using, respectively, each at least one fine-level training data set. These trained models are used to generate, respectively, coarse-level binary predictions (e.g., into either the majority class or the combined non-majority class) and fine-level predictions (e.g., into particular non-majority classes) with respect to an input data set, which predictions are then combined to form a multi-class classification with respect to the input data set. Accordingly, the presently disclosed multi-class classification system improves accuracy of predictions with respect to not only the minority class but any intermediate classes as well, thus improving performance without sacrificing efficiency and expanding the range of applications of the pertinent multi-class classification functionality, among other examples.

FIG. 1 illustrates an exemplary block diagram of an environment 100 in which embodiments of the present disclosure may operate. Specifically, FIG. 1 illustrates a multi-class classification system 140, a quality management system 120, one or more data repositories 150, and one or more user devices 160, all connected to a network 130.

The network 130 may be embodied in any of a myriad of network configurations. In some embodiments, the network 130 may be a public network (e.g., the Internet). In some embodiments, the network 130 may be a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

The one or more data repositories 150 may be configured to receive, store, and/or transmit data. In some embodiments, the one or more data repositories 150 may be configured to store enterprise data associated with production of one or more products by one or more enterprises (e.g., quality management data, product data, process data, system data, any data that may be used in connection with quality management operations including any data that may be included in and/or used to generate a training data set for a multi-class classification model, and/or any related object data and/or metadata). In some embodiments, the one or more data repositories 150 may be configured to store data associated with development, configuration, training, and/or use (e.g., by the multi-class classification system 140) of one or more machine learning models corresponding to multi-class and/or binary prediction tasks associated with quality management for production of the product(s), including, for example, original and/or adapted training data, any data defining trained model weights, parameters, and/or hyper-parameters for trained classification models, binary and/or multi-class output data produced via trained classification models. In various embodiments, some or all of the data stored in the one or more data repositories 150 may be stored in a shared memory system shared between the quality management system 120 and/or the multi-class classification system 140 and/or may be otherwise accessible to the quality management system 120 and the multi-class classification system 140.

The one or more user devices 160 may be associated with and/or operated by users of the quality management system 120, the multi-class classification system 140, and/or one or more enterprise systems associated with the one or more products and/or production of the one or more products. In one example, the enterprise system(s) associated with the one or more products and/or production thereof may cause data associated with the production of the one or more products to be transmitted to, to be displayed on, and/or to be used to generate data or interface elements displayed on the user devices(s) 160 and/or may cause one or more interfaces (e.g., user interfaces) to be presented via the user device(s) 160, which interface(s) may be configured to receive input comprising and/or used to generate any data associated with the one or more products and/or production thereof, including, in some examples, product data, process data, and/or system data. In another example, the quality management system 120 may cause data associated with development, configuration, monitoring, tracking, optimization, and/or performance of quality management operations and/or objectives with respect to production of the product(s) to be transmitted to, to be displayed on, and/or to be used to generate data or interface elements displayed on the user devices(s) 160 and/or may cause one or more interfaces (e.g., user interfaces) to be presented via the user device(s) 160, which interface(s) may be configured to receive input comprising and/or used to generate any data associated with the quality management operations and/or objectives. In another example, the multi-class classification system 140 may cause data associated with development, configuration, training, and/or use of one or more machine learning models corresponding to multi-class and/or binary prediction tasks associated with quality management for production of the product(s) to be transmitted to, to be displayed on, and/or to be used to generate data or interface elements displayed on the user devices(s) 160 and/or may cause one or more interfaces (e.g., user interfaces) to be presented via the user device(s) 160, which interface(s) may be configured to receive input comprising and/or used to generate any data associated with the machine learning model(s).

The multi-class classification system 140 may be a computing system or device (e.g., server system) configured via hardware, software, firmware, and/or a combination thereof, to perform multi-class classification functionality comprising, for example, transforming original training data into adapted training data, training classification models, generating output data using the trained models, transforming binary output data into multi-class output data, and/or causing performance of enterprise management operations (e.g., quality management operations) based on the output data.

The quality management system 120 may be a computing system or device (e.g., server system) configured via hardware, software, firmware, and/or a combination thereof, to perform quality management operations with respect to production of the product(s), including, for example, presenting interface(s) configured to receive input used in performance of the quality management operations, receiving (e.g., via the presented interface(s)) the input used in performance of the quality management operations, generating, receiving, accessing, retrieving, and/or aggregating quality management events and/or any event data comprised by or derived therefrom, and/or performing the quality management operations based on the retrieved event data and/or quality management events. In some embodiments, the quality management system 120 may correspond to and/or comprise a quality management software system and/or quality management system similar to and/or performing similar functionality as a quality management software system and/or quality management system as defined and described above.

In various embodiments, the quality management system 120 and the multi-class classification system 140 may have varying degrees of integration with respect to each other. For example, the quality management system 120 and the multi-class classification system 140 may be configured to transmit and/or receive communications and/or data with respect to each other and/or access commonly accessible or shared data stores to exchange training data, input data, and/or output data associated with the classification models. In another example, the multi-class classification system 140 may be a sub-system of and/or otherwise integrated as part of the quality management system 120. In another example, the quality management system 120 and the multi-class classification system 140 may be sub-systems of and/or otherwise integrated as part of a greater enterprise management system or enterprise performance management system configured to perform one or more enterprise management operations (e.g., including quality management operations) with respect to one or more products produced by one or more enterprises and/or one or more processes and/or systems associated with production of the one or more products.

While FIG. 1 illustrates certain components as separate, standalone entities communicating over the network 130, various embodiments are not limited to this configuration. In other embodiments, one or more components may be directly connected and/or share hardware or the like.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. Examples of an apparatus 200 may include, but is not limited to, one or more components of one or more operational systems associated with the one or more products and/or production of the one or more products, a multi-class classification system 140, a quality management system 120, data repositories 150, and/or user devices 160. The apparatus 200 includes processor 202, memory 204, input/output circuitry 206, communications circuitry 208, and/or transformation circuitry 210, training circuitry 212, classification circuitry 214, and/or integration circuitry 216. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, a device, system, or apparatus, such as apparatus 200 of one or more components of one or more operational systems associated with the one or more products and/or production of the one or more products, a multi-class classification system 140, a quality management system 120, data repositories 150, and/or user devices 160, may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or co-processor or any other processing circuitry assisting or otherwise associated with the processor) is/are in communication with the memory 204 via a bus for passing information among components of the apparatus 200.

Memory 204 or memory circuitry embodying the memory 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a computing device and/or other display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device and/or other external computing device(s) in communication with the apparatus 200.

Transformation circuitry 210 may be included in the apparatus 200 (e.g., an apparatus specifically corresponding to the multi-class classification system 140). The transformation circuitry 210 may include hardware, software, firmware, and/or a combination thereof, designed and/or configured to request, receive, process, generate, and transmit data, data structures, control signals, and electronic information for adapting binary classification models for performance of multi-class classification tasks, including performing any of the operations described herein with respect to generating adapted training data and/or generating multi-class output data.

Training circuitry 212 may be included in the apparatus 200 (e.g., an apparatus specifically corresponding to the multi-class classification system 140). The training circuitry 212 may include hardware, software, firmware, and/or a combination thereof, designed and/or configured to request, receive, process, generate, and transmit data, data structures, control signals, and electronic information for functionality related to training classification models, including performing any of the operations described herein with respect to training a binary classification model (e.g., using an adapted training data set).

Classification circuitry 214 may be included in the apparatus 200 (e.g., an apparatus specifically corresponding to the multi-class classification system 140). The classification circuitry 214 may include hardware, software, firmware, and/or a combination thereof, designed and/or configured to request, receive, process, generate, and transmit data, data structures, control signals, and electronic information for functionality related to performing classification tasks, including performing any of the operations described herein with respect to generating binary output data using a trained binary classification model.

Integration circuitry 216 may be included in the apparatus 200 (e.g., an apparatus specifically corresponding to the multi-class classification system 140 and/or the quality management system 120). The integration circuitry 216 may include hardware, software, firmware, and/or a combination thereof, designed and/or configured to request, receive, process, generate, and transmit data, data structures, control signals, and electronic information for functionality related to integration between the multi-class classification system 140 and the quality management system 120, including performing any of the operations described herein with respect to communication between the systems, accessing common data stores, generating data by one system for interpretation, parsing, and/or use by the other system, and/or causing performance of quality management operations by the quality management system 120.

In some embodiments, two or more of the sets of circuitries 202-216 are combinable. Alternatively, or additionally, one or more of the sets of circuitry 202-216 perform some or all of the operations and/or functionality described herein as being associated with another circuitry. In some embodiments, two or more of the sets of circuitry 202-216 are combined into a single module embodied in hardware, software, firmware, and/or a combination thereof. For example, in some embodiments, one or more of the sets of circuitry, for example the transformation circuitry 210, may be combined with the processor 202, such that the processor 202 performs one or more of the operations described herein with respect to the transformation circuitry 210.

FIG. 3 is an illustration of an example multi-class classification system 140, in accordance with at least some example embodiments of the present disclosure. Specifically, FIG. 3 includes schematic depictions of the example multi-class classification system 140, including example internal processes and components of the multi-class classification system 140, and/or schematic depictions of the one or more data repositories 150 and the quality management system 120 in communication with the multi-class classification system 140, along with example data objects used by and/or produced by the depicted processes, components, and/or systems. The multi-class classification system 140 and/or apparatuses 200 associated therewith, for example, may be specially configured via hardware, software, firmware, and/or a combination thereof, to perform the various data processing and interactions described with respect to FIG. 3 to perform multi-class classification using an adapted, two-level binary classification model and adapted training data set(s) with respect to one or more products produced by one or more enterprises.

In the illustrated example, the multi-class classification system 140 comprises, in some examples, a pre-classification transformation process 312, a post-classification transformation process 332, a training process 322 corresponding to a binary classification model 320 (including a coarse-level instance 322a of the training process 322 and a fine-level instance 322b of the training process 322), and a prediction process 324 corresponding to the binary classification model 320 (including a coarse-level instance 324a of the training process 324 and a fine-level instance 324b of the training process 324). Additionally, the one or more data repositories 150 comprise, in some examples, one or more enterprise data stores 304 and/or an original training data set 310.

In an example scenario, enterprise data for one or more enterprises may be generated, collected, captured, received, accumulated, and/or stored in connection with one or more products produced by the enterprise(s), one or more processes associated with production of the product(s), and/or one or more operational systems associated with the process(es) and/or product(s). Such enterprise data may be stored in one or more enterprise data stores 304 associated with the enterprise(s).

In various embodiments, the enterprise data may comprise any data associated with one or more products produced by one or more enterprises, including product data, process data, system data, operational data, any data that may be used in connection with quality management operations including quality management data and/or any data that may be included in and/or used to generate a training data set for a multi-class classification model, and/or any relevant object data and/or metadata, to list a few examples.

In one example, product data of the enterprise data stored in the enterprise data store(s) 304 may comprise various items of data and/or metadata identifying and/or characterizing the product(s) produced by the enterprise with which the enterprise data is associated, including measured, calculated, sensed, and/or otherwise determined values corresponding to various attributes associated with the product(s) in general and/or particular instances and/or batches of the product(s) that have been produced, to list a few examples.

In another example, process data of the enterprise data stored in the enterprise data store(s) may comprise various items of data and/or metadata identifying, defining, and/or characterizing the process(es) associated with the production of the product(s) (e.g., research processes, manufacturing processes, testing processes, distribution processes, quality management processes, business processes), including measured, calculated, sensed, manually configured, and/or otherwise determined values corresponding to various attributes associated with the process(es), to list a few examples.

In another example, system data of the enterprise data stored in the enterprise data store(s) may comprise various items of data and/or metadata identifying, defining, establishing configuration parameters for, and/or characterizing operational system(s) associated with the process(es) and/or products (e.g., any computing, mechanical, automation, monitoring, control, laboratory, manufacturing, and/or distribution systems or equipment), including measured, calculated, sensed, manually configured, and/or otherwise determined values corresponding to various attributes associated with the operational system(s), environments where the system(s) are installed, components (e.g., equipment, assets) comprised by the system(s), configuration parameters defining functionality of the system(s) and/or its components, and/or operational sessions during which the system(s) have previously operated, to list a few examples.

In another example, object data and/or metadata of the enterprise data stored in the enterprise data store(s) 304 may comprise various items of data and/or metadata identifying, defining, and/or characterizing various real or virtual objects associated with the product(s) or production thereof and/or any relationships between said objects.

In another example, in some embodiments, aggregated quality management data 302 of the enterprise data stored in the enterprise data store(s) 304 may comprise data received, generated, and/or aggregated by and/or within the quality management system 120, including any data associated with production of products required or utilized for quality management purposes. In some embodiments, the aggregated quality management data 302 may comprise quality management events (e.g., generated and/or logged by the quality management system based on input from various sources, including possibly internal enterprise data associated with production of the relevant products, data generated and/or received in connection with provision or use of the relevant products, and/or data characterizing and/or derived from communications with various entities associated with production, consumption, and/or use of the relevant products). In one example, the quality management events of the aggregated quality management data 302 may comprise text objects with text characterizing how products were provided, consumed, and/or used, text characterizing particular contexts in which products were provided, consumed, and/or used, text characterizing certain effects resulting from provision, consumption, and/or use of the products, among other examples, and/or text representing, characterizing, and/or describing customer complaints arising from provision, consumption, and/or use of the products subject to quality management by the quality management system 120.

Although the illustrated example concerns text objects and particularly text objects containing text from quality management events from aggregated quality management data 302 aggregated by and/or within the quality management system 120, it will be appreciated that the present disclosure may be applicable to any type of data upon which a multi-class classification is possible and/or, more particularly, any data that is imbalanced or populated with objects that are distributed unevenly across a majority classification set and two or more non-majority classification sets.

In some embodiments, the enterprise data stored in the enterprise data store(s) 304, including the aggregated quality management data 302, may comprise and/or may be generated based at least in part on input received from one or more users (e.g., via user interfaces presented on the user device(s) 160) in connection with the product(s) and/or process(es) related to production of the product(s). In one example, the aggregated quality management data 302 may comprise data characterizing and/or derived from communications with various entities (e.g., customers) associated with production, consumption, and/or use of the relevant products, including data generated based on input (e.g., user input) received via various types of forms associated with quality management operations and/or presented via the quality management system 120, including complaint forms, supplier quality management forms, audit forms, risk forms, and/or quality event forms, to list a few examples.

Moreover, in various embodiments, the enterprise data stored in the enterprise data store(s) 304 may be associated with and/or generated during or in connection with any phase of production of the product(s) and/or any corresponding process(es), including any research, manufacturing, testing, distribution, quality management, and/or business phases or processes.

In various embodiments, any of the enterprise data stored in the enterprise data store(s) 304 (including the aggregated quality management data 302) may be included in and/or used to derive an original training data set 310 corresponding to a multi-class classification task. The original training data set 310 may comprise a multi-class classification of training objects (e.g., data objects corresponding to and/or derived from the enterprise data stored in the enterprise data store(s)) each into exactly one original classification set of a plurality of original classification sets comprising at least three original classification sets. In some embodiments, the multi-class classification of the training objects in the original data set 310 may be provided via training annotation data 308 included in the original training data set 310 in association with the training objects. For example, each particular training object included in the original training data set 310 may be associated with a (e.g., exactly one) classification label (e.g., provided in the training annotation data 308), each classification label corresponding to and/or representing an original classification set into which the particular training object is classified.

In some example scenarios, the original training data set 310 may comprise an imbalanced multi-class classification of the training objects, for example, as a result of underlying imbalances in the underlying content and/or context described by and/or referenced by the data. Put another way, the training objects reflected in the original training data set 310 may be distributed unevenly across the plurality of original classification sets. For example, a relatively large proportion of the training objects may be classified into a majority classification set, which may refer to the original classification set from the plurality of original classification sets into which the largest proportion (from among all of the original classification sets) of training objects are classified in the original training data set 310. In this case, the remaining training objects (e.g., those that are not classified into the majority classification set) may be classified into two or more non-majority classification sets, which may refer to any original classification set from among the plurality of original classification sets that is not the majority classification set. Of the non-majority classification sets, a minority classification set may refer to the original classification set from the plurality of original classification sets into which the smallest proportion (from among all of the original classification sets) of training objects are classified in the original training data set 310, and at least one intermediate classification set may refer to any original classification set from among the plurality of original classification sets that is neither the majority classification set nor the minority classification set.

For the purpose of illustration, an example original training data set such as that embodied in the original training data set 310 may comprise a multi-class classification of training objects each into exactly one original classification set from among exactly three original classification sets. In such a data set, for example, approximately 85% of training objects may be classified into a majority classification set, approximately 14% of training objects may be classified into an intermediate classification set, and approximately 1% of training objects may be classified into a minority classification set. It will be appreciated that these percentages are provided merely to illustrate an example of an imbalanced distribution in a training data set, but many other distributions across the majority, intermediate, and minority classes may be possible in an imbalanced data set to which the present invention is applicable.

In some embodiments, the original training data set 310 may comprise and/or may be derived from sample event data 306 from the enterprise data store(s) 304. The sample event data 306 may comprise quality management events (e.g., from the aggregated quality management data 302), including, for example, text objects containing textual descriptions or narratives characterizing, in some examples, how products were provided, consumed, and/or used, characterizing particular contexts in which products were provided, consumed, and/or used, characterizing certain effects resulting from provision, consumption, and/or use of the products, among other examples, and/or representing, characterizing, and/or describing customer complaints arising from provision, consumption, and/or use of the products subject to quality management by the quality management system 120. The training objects of the original training data set 310 may correspond to and/or comprise the text objects from the sample event data 306. Moreover, in some embodiments, each of the original classification labels (of the training annotation data 308) may correspond to and/or represent a particular severity level corresponding, for example, to the situations, events, and/or conditions described in the text of the text objects, with the possible severity levels including, in one example, mild, moderate, and serious. In some embodiments, the training annotation data 308 may be generated based at least in part on user input (e.g., received via a user interface) with respect to the text objects in the sample event data 306, such user input, in one example, being received from a user that is a subject matter expert. In some embodiments, the training annotation data 308 may be generated automatically (e.g., via one or more analysis algorithms) and/or may be native to the sample event data 306 (e.g., corresponding to features or attributes already present in the sample event data 306). Additionally or alternatively, the original training data set 310 may comprise data sufficient for training of a multi-class classification model to perform a multi-class classification task.

In various embodiments, the multi-class classification system 140 may be configured to perform a multi-class classification task with respect to a given input data set by using an adapted binary classification model 320.

More particularly, the multi-class classification system 140 may be configured to perform the multi-class classification task using the adapted binary classification model 320 in conjunction with pre-classification processing functionality for adapting multi-class training data (e.g., the original training data set 310) for use with the binary classification model 320 by transforming the multi-class training data into binary training data. For example, in some embodiments, the pre-classification transformation process 312 of the multi-class classification system 140 may be configured to receive, retrieve, and/or access original training data 314 (from the original training data set 310 stored in the one or more data repositories 150). The original training data 314 may correspond to the data comprised by the original training data set 310 and/or may comprise some or all of the data of the original training data set 310 as defined and described above. The pre-classification transformation process 312 may be configured to transform the original training data 314 into adapted training data 318, which may include coarse-level adapted training data 318a and fine-level adapted training data 318b.

In some embodiments, the coarse-level adapted training data 318a may comprise a binary classification of the training objects from the original training data set each into one of: a majority classification set and a non-majority classification set. The majority classification set may correspond to a particular original classification set of the plurality of original classification sets reflected in the original training data 314, particularly the original classification set into which the largest proportion of the training objects are classified in the original training data 314 (relative to other original classification sets of the plurality of original classification sets reflected in the original training data 314). The non-majority classification set may represent a combination of the other original classification sets of the plurality of original classification sets (other than the particular original classification set to which the majority classification set of the coarse-level adapted training data 318a corresponds). Put another way, the majority classification set of the coarse-level adapted training data 318a may correspond to the majority classification set of the original training data 314 (as previously defined and described with respect to the original training data 314 and/or original training data set 310), and the non-majority classification set of the coarse-level adapted training data 318a may correspond to and/or represent a combination of the minority classification set and any intermediate classification sets of the original training data 314 (as previously defined and described with respect to the original training data 314 and/or original training data set 310). In various embodiments, the coarse-level adapted training data 318a may form a single, discrete training data set (e.g., to be used in conjunction with a corresponding instance of the binary classification model 320).

In some embodiments, the fine-level adapted training data 318b may comprise a classification of a selected subset of the training objects from the original training data 314, including, for example, only training objects classified into the non-majority classification set in the coarse-level adapted training data 318a or, put another way, only training objects classified into the minority classification set and any intermediate classification sets in the original training data 314 (as previously defined and described with respect to the original training data 314 and/or original training data set 310). Each of the training objects from the selected subset may be classified in the fine-level adapted training data 318b into exactly one classification set corresponding to an original classification set (e.g., from among the combination of original classification sets represented by the non-majority classification set of the coarse-level adapted training data 318a and/or from among the minority classification set and any intermediate classification sets in the original training data 314). More particularly, each particular training object of the training objects reflected in the fine-level adapted training data 318b may be classified in the fine-level adapted training data 318b into whichever original classification set into which the particular training object is classified in the original training data 314. In various embodiments, the fine-level adapted training data 318b may form at least one discrete training data set (e.g., to be used in conjunction with at least one corresponding instance(s) of the binary classification model 320), each of which may comprise a binary classification of the training objects into exactly one classification set of exactly two classification sets, including a first classification set and a second classification set that, in some examples, each correspond to a different original classification set (e.g., from among those represented by the non-majority classification set of the coarse-level adapted training data 318a). In some example scenarios (in which the original training data 314 comprises only a single intermediate classification set along with the majority and minority classification sets), the fine-level adapted training data 318*b* may form a single, discrete training data set (e.g., to be used in conjunction with a corresponding instance of the binary classification model 320) comprising a binary classification of the training objects into exactly one classification set of exactly two classification sets, one of which may correspond to the minority classification set of the original training data 314 and the other of which may correspond to the (e.g., single remaining) intermediate classification set of the original training data 314.

Put another way, a training object classified into the minority classification set or any intermediate classification set in the original training data 314 may be transformed such that, in the adapted training data 318, that training object, in the coarse-level adapted training data 318*a*, is classified into a combined classification set (e.g., the non-minority classification set) representing a combination of the minority and intermediate classification sets from the original training data 314 and, in the fine-level adapted training data 318*b*, is classified into a particular classification set that corresponds with the original classification set for the particular training object in the original training data 314. Similarly, a training object classified into the majority classification set in the original training data 314 may be transformed such that, in the adapted training data 318, that particular training object is not included in the fine-level adapted training data 318*b* but is classified in the coarse-level adapted training data 318*a* into a particular classification set (e.g., the majority classification set) that corresponds to the original classification set for the particular training object in the original training data 314.

In various embodiments, the binary classification model 320 may be a machine learning model for implementing a binary classification with respect to a given input data set, in which each object of the input data set is classified into exactly one classification set from among exactly two classification sets. In one example, a particular instance of the binary classification model 320 may be trained for a particular classification task (e.g., classifying certain types of objects into certain classification sets based on certain features associated with the objects being classified) using a training data set, and such a particular instance of the binary classification model 320, as trained using the training data set, may be used, in turn, to generate binary classifications with respect to a given input data set. The multi-class classification system 140 may be configured to train various instances of the binary classification model 320 based at least in part on the adapted training data 318 and to generate binary output data 330 with respect to an input data set using the trained instance(s) of the binary classification model 320. More particularly, the multi-class classification system 140 may be configured to train a coarse-level instance of the binary classification model 320 based at least in part on the coarse-level adapted training data 318*a* and to generate coarse-level binary output data 330*a* (of the binary output data 330) with respect to the input data set using the trained coarse-level instance of the binary classification model 320. Similarly, the multi-class classification system 140 may be configured to train at least one fine-level instance of the binary classification model 320 based at least in part on, respectively, each discrete training data set forming the fine-level adapted training data 318*b* and to generate fine-level binary output data 330*b* (of the binary output data 330) with respect to the input data set using, respectively, the trained at least one fine-level instance of the binary classification model 320.

More particularly, various instances of the binary classification model 320 may be configured by and/or based at least in part corresponding instances of the training process 322 and the prediction process 324.

In various embodiments, various instances of the binary classification model 320 may undergo a training operation (e.g., performed by an instance of the training process 322) using a training data set. The training data set may comprise the adapted training data 318 (as defined and described above) along with possibly any data associated with training objects included in the adapted training data 318 that is relevant to the particular prediction task that the binary classification model 320 is being trained to perform, including any portions of the enterprise data and/or aggregated quality management data 302.

In various embodiments, an instance of the binary classification model 320 may comprise a data object created by using machine learning to learn to perform a given function (e.g., a prediction) through training with the training data set (e.g., adapted training data 318). The binary classification model 320 may be trained to generate predictions (e.g., included in the binary output data 330) by learning from the training data set. For example, the binary classification model 320 may comprise a mapping function $f$ from input variables x to discrete output variables y. The training process 322 may be configured to formulate a particular mapping function $f$ from input variables x (corresponding to features of the training data set and an input data set associated with a particular object) to a discrete output variable y (representing a predicted classification set into which the particular object should be classified).

More particularly, in one example, an instance of the binary classification model 320 may undergo training (e.g., by a corresponding instance of the training process 322) using the training data set (e.g., including the adapted training data 318) in order to identify features from the training data set and to determine optimal coefficients representing adjustment or weights to apply with respect to the features in order to produce a target value reflected in the training data set, for example, based on positive and/or negative correlations between the target values and various features of the training data set. The target value for the binary classification model 320 may represent a classification of an object into a predicted classification set and may correspond to an original classification set from the original training data 314 or a combination thereof, including the majority and non-majority classification sets from the coarse-level adapted training data 318*a* or any classification sets from the fine-level adapted training data 318*b*, as indicated for each training object in the adapted training data 318. The features may correspond to various domain-specific attributes reflected in the training data set, including characteristics of the training objects (e.g., text objects) included in the adapted training data 318 and/or any attributes associated with the training objects from the sample event data 306, aggregated quality management data 302, and/or any other enterprise data stored in the enterprise data store(s) 304.

In some embodiments, the training data set (e.g., comprising at least the adapted training data 318) may be input into an instance of the training process 322 corresponding to the binary classification model 320 to train the model(s) to generate the predictions (e.g., defined in the binary output data 330). In one example, for the binary classification model 320, a product of the model training (e.g., by the training process 322) are trained model weights 326 that are used by a corresponding instance of the prediction process 324 corresponding to the binary classification model 320. In some embodiments, after an initial training, further training data (e.g., including subsequently received and/or generated sample event data 306) may be input to the training process 322 corresponding to the multi-class classification model 320, periodically or on an on-going basis, to refine and update the model(s).

More particularly, a training data set comprising the coarse-level adapted training data 318a may be input into the coarse-level instance 322a of the training process 322 to train a coarse-level instance of the binary classification model 320 to generate a coarse-level binary classification (e.g., into one of the majority classification set and the non-majority classification set). A product of the model training (e.g., by the coarse-level instance 322a of the training process 322) are coarse-level trained model weights 326a that are used by a corresponding coarse-level instance 324a of the prediction process 324 to generate the predictions.

Similarly, a training data set comprising the fine-level adapted training data 318b may be input into the fine-level instance 322b of the training process 322 to train a fine-level instance of the binary classification model 320 to generate a fine-level binary classification (e.g., in which the selected subset of objects including those classified into the non-majority classification set by the coarse-level instance 324a of the prediction process 324 are also classified into individual classification sets). A product of the model training (e.g., by the fine-level instance 322b of the training process 322) are fine-level trained model weights 326b that are used by a corresponding fine-level instance 324b of the prediction process 324 to generate the predictions.

The binary classification model 320 may be trained (e.g., via the training process 322) to generate a prediction (e.g., included in the binary output data 330) based at least in part on an input data set, which may be embodied in and/or comprise production event data 328, for example.

In some embodiments, an input data set (e.g., embodied in and/or comprising the production event data 328) for generating a prediction (e.g., included in the multi-class output data 330) may comprise a current instance (e.g., reflecting current or up-to-date data at an instance of time when the prediction is being generated) of any of the enterprise data and/or aggregated quality management data 302 stored in the enterprise data store(s) 304, and/or any other data relevant to the multi-class classification task being performed. In one example, the input data set (e.g., embodied in and/or comprising the production event data 328) may comprise production objects (e.g., text objects) of the same type as and/or analogous to the training objects reflected in the training data set (e.g., including the adapted training data 318), including any associated attributes or features, but without any classification of the production objects into classification sets, and the prediction process 324 may be configured to generate the binary output data 330 to comprise a classification of the production objects into classification sets based on the training of the model performed by the corresponding instance of the training process 322 as defined and described above. In some embodiments, the production event data 328 may comprise quality management events (e.g., from the aggregated quality management data 302), including, for example, text objects containing textual descriptions or narratives characterizing, in some examples, how products were provided, consumed, and/or used, characterizing particular contexts in which products were provided, consumed, and/or used, characterizing certain effects resulting from provision, consumption, and/or use of the products, among other examples, and/or representing, characterizing, and/or describing customer complaints arising from provision, consumption, and/or use of the products subject to quality management by the quality management system 120. The production objects of the input data set may correspond to and/or comprise the text objects from the production event data 328.

In some embodiments, an input data set (e.g., embodied in and/or comprising the production event data 328) may be input into an instance of the prediction process 324 corresponding to the multi-class classification model 320, and, in response to receiving the input data set, the instance of the prediction process 324 may be configured to generate the binary output data 330 with respect to the input data set based at least in part on the input data set and/or on the corresponding trained model weights 326 generated during training of the model.

More particularly, an input data set (e.g., embodied in and/or comprising the production event data 328) may be input into the coarse-level instance 324a of the prediction process 324, and, in response to receiving the input data set, the coarse-level instance 324a of the prediction process 324 may be configured to generate the coarse-level binary output data 330a with respect to the input data set based at least in part on the input data set and/or on the coarse-level trained model weights 326a generated during training of the coarse-level instance of the model. The coarse-level instance 324a of the prediction process 324 may be configured to generate the coarse-level binary output data 330a by performing, using the trained coarse-level instance of the binary classification model 320, a coarse-level classification of all of the production objects reflected in the input data set into one of the majority classification set and the non-majority classification set (e.g., respectively corresponding to the majority classification set and the non-majority classification set of the coarse-level adapted training data 318a as defined and described above).

Similarly, an input data set (e.g., embodied in and/or comprising the production event data 328) may be input into the fine-level instance 324b of the prediction process 324 along with possibly the coarse-level binary output data 330a and, in response to receiving the input data set and/or the coarse-level binary output data 330a, the fine-level instance 324b of the prediction process 324 may be configured to generate the fine-level binary output data 330b with respect to the input data set based at least in part on the input data set, the fine-level trained model weights 326b generated during training of the coarse-level instance of the model, and/or the coarse-level binary output data 330a. The fine-level instance 324b of the prediction process 324 may be configured to generate the fine-level binary output data 330b by performing, using the trained at least one fine-level instance of the binary classification model 320, at least one fine-level classification of a selected subset of the production objects reflected in the input data set (e.g., including only production objects classified into the non-majority classification set as indicated in the coarse-level binary output data 330a) into particular classification sets (e.g., corresponding to individual original classification sets from the original training data 314).

The binary output data 330 may comprise a binary classification of production objects from the input data set each into exactly one classification set from among a plurality of classification sets (such as an original classification set from the original training data 314 or a combination thereof, including the majority or non-majority classification sets from the coarse-level adapted training data 318a or any classification sets from the fine-level adapted training data 318b, as indicated for each training object in the adapted training data 318). More particularly, the coarse-level binary output data 330a may comprise a binary classification of all production objects from the input data set each into exactly one of: the majority classification set and the non-majority classification set (e.g., from the coarse-level adapted training data 318a). The fine-level binary output data 330b may comprise a binary classification of a selected subset of the production objects (including only production objects classified into the non-majority classification set as indicated in the coarse-level binary output data 330a) each into a particular original classification set from among the combination of original classification sets represented by the non-majority classification set.

In various embodiments, the multi-class classification system 140 may be configured to perform the multi-class classification task using the adapted binary classification model 320 in conjunction with post-classification processing functionality for transforming a coarse-level binary classification and a fine-level binary classification into a multi-class classification suitable for use in a present enterprise management context (e.g., performing quality management operations). For example, in some embodiments, the post-classification transformation process 332 of the multi-class classification system 140 may be configured to receive the binary output data 330 output by the various instances of the prediction process 324, including the coarse-level binary output data 330a and the fine-level output data 330b. The post-classification transformation process 332 may be configured to transform the binary output data 330 into multi-class output data 334, for example, by combining the coarse-level output data 330a and the fine-level output data 330b to produce the multi-class output data 334. More particularly, in some examples, the post-classification transformation process 332 may be configured to combine the coarse-level output data 330a and the fine-level output data 330b by combining the classification of the majority subset of the production objects into the majority classification set in the coarse-level output data 330a with the classification of the remaining production objects into particular classification sets in the fine-level output data 330b such that the resulting multi-class output data 334 comprises a classification of each production object from the input data set into exactly one of the original classification sets (e.g., from the original training data 314).

In some embodiments, the multi-class output data 334 may comprise a multi-class classification of production objects from the input data set each into exactly one classification set from among a plurality of classification sets. In one example, the multi-class output data 334 may comprise a classification of the production objects from the input data set each into exactly one original classification set of the plurality of original classification sets from the original training data set 310 and/or original training data 314.

In various embodiments, the coarse-level and fine-level instances of the training process 322 and the prediction process 324 may be explicitly or implicitly coupled together. For example, according to the implicit approach, both the coarse-level and fine-level instances of the binary classification model 320 may be trained together simultaneously. According to the explicit approach, each of the coarse-level and the fine-level instances of the binary classification model 320 may be trained independently and in parallel.

Additionally or alternatively, in cases where a large imbalance is still present within the fine-level classification of the selected subset of (e.g., non-majority) training objects into their corresponding original classification sets, further coarse-level classifications may be performed with respect to the selected subset, with a majority class among the subset being determined and non-majority classes among the subset being grouped together for the additional coarse-level classification. In this way, in certain scenarios, the multi-class classification system 140 may be configured to construct a hierarchy of various instances of the binary classification model 320 in which an initial coarse-level classification leads to one or more additional coarse-level classifications until a sufficiently balanced training data set is produced for use with one or more fine-level classifications of any objects remaining after the various coarse-level classifications.

In various embodiments, the multi-class classification system 140 may be configured to cause performance (e.g., by the quality management system 120) of at least one enterprise management operation based at least in part on the multi-class output data 334. In one example, the enterprise management operation(s) caused to be performed by the multi-class classification system 140 based on the multi-class output data 334 may include one or more quality management operation(s) 336. For example, in some example scenarios and/or in some embodiments, the quality management system 120 may be configured to receive the multi-class output data 334 from the multi-class classification system 140 to perform the quality management operation(s) 336 (e.g., with respect to the various research, development, manufacturing, distribution, and/or service provision processes associated with production of the product(s) subject to quality management by the quality management system 120). In one example, based at least in part on the multi-class output data 334, the quality management system 120 may be configured to perform quality management operations 336 including updating a GUI of the quality management system 120 (e.g., to display the multi-class output data 334 and/or data derived therefrom in a particular manner), generating and/or transmitting alerts, generating, organizing, and/or formatting reports, and/or performing automated operations (e.g., generating and submitting orders, scheduling service and/or inspection, generating related quality management events, performing automatic service and/or diagnostic operations), to list a few examples.

FIG. 4 is an illustration of example data objects used by and/or produced by the multi-class classification system 140 at various stages of adapting a binary classification model for use in performing a multi-class classification.

At a first stage 402, an example original training data set (e.g., corresponding to and/or comprising the original training data set 310 and/or the original training data 314) is shown in its form before transformation by the multi-class classification system 140 into at least two adapted training data sets (e.g., corresponding to and/or comprising the coarse-level adapted training data 318a and the fine-level adapted training data 318b). In particular, the illustrated example concerns classification of text objects (e.g., from quality management events) into one or more classification sets corresponding to levels of severity as defined and described above. The original training data set at the first stage 402 specifies values corresponding to a "Description" attribute and a "Severity" attribute with respect to a series of training objects (e.g., text objects). The "Description" attribute may identify a particular training object (e.g., a particular text object containing a textual description of a situation or conditions related to provision of a product produced by an enterprise) while the associated "Severity" attribute may indicate an original classification label associated with the training object identified via the "Description" attribute. In the example original training data set shown at the first stage 402, each of the training objects may be associated with exactly one original classification set from among exactly three classification sets ("Mild", "Moderate", "Serious"), for example, with the various training objects having a "one to one" correspondence with the various classification labels. In this way, for example, the original training data set shown with respect to the first stage 402 may correspond to a multi-class classification task. In the illustrated example, the training objects identified as "Description1", "Description2", and "Description3" are each classified into an original classification set represented by a "Mild" classification label (e.g., representing a mild or relatively low level of severity), the training objects identified as "Description4" and "Description5" are each classified into an original classification set represented by a "Moderate" classification label (e.g., representing a moderate or medium level of severity), and the training object identified as "Description6" is classified into an original classification set represented by a "Serious" classification label (e.g., representing a serious or relatively high level of severity).

Notably, half of the training objects are classified as "Mild," while only one third of the training objects are classified as "Moderate," and only one sixth of the training objects are classified as "Serious," making the illustrated training data set an example imbalanced data set to which the present invention is applicable. In the illustrated example, the "Mild" classification set may be considered a majority classification set of the training data, the "Moderate" classification set may be considered an intermediate classification set, and the "Serious classification set may be considered a minority classification set.

At a second stage 404, example adapted training data (e.g., corresponding to and/or comprising the adapted training data 318) is shown in its form after transformation by the multi-class classification system 140 from the original training data set shown with respect to the first stage 402. In the illustrated example, the adapted training data comprises a coarse-level adapted training data set (e.g., corresponding to and/or comprising the coarse-level adapted training data 318a) and a fine-level adapted training data set (e.g., corresponding to and/or comprising the fine-level adapted training data 318b). As with the original training data at the first stage 402, the adapted training data sets shown at the second stage 404 specify values corresponding to the "Description" attribute with respect to a series of training objects, the specified values identifying particular training objects (from among those indicated in the original training data set shown with respect to the first stage 402). Now, however, in the coarse-level adapted training data set, each of the training objects is assigned a value corresponding to a "Severity coarse-level" attribute, which may represent a particular classification set from the original training data (namely, the majority classification set) or a combined classification set representing a combination of particular classification sets from the original training data (namely, the intermediate and minority classification sets). In the fine-level adapted training data set, each of the training objects is assigned a value corresponding to a "Severity fine-level" attribute, which may represent a particular classification set from the original training data (namely, one of the intermediate or minority classification sets).

Notably, in each of the example adapted training data sets shown at the second stage 404, training objects may be associated with exactly one classification set out of exactly two possible sets. In the case of the coarse-level adapted training data, training objects may be classified as either "Mild" or "Not Mild," and in the fine-level adapted training data, training objects may be classified as either "Moderate" or "Serious." In this way, for example, the adapted training data set shown with respect to the second stage 404 may correspond to a binary classification task.

Moreover, in the example coarse-level adapted training data shown at the second stage 404, all of the training objects from the original training data are included, with those assigned the "Mild" label of the majority classification set in the original training data retaining the "Mild" label in the coarse-level adapted training data and those assigned the "Moderate" and "Serious" labels of, respectively, the intermediate and minority classification sets in the original training data classified into a combined "Not Mild" label in the coarse-level adapted training data. In the example fine-level adapted training data shown at the second stage 404, only a selected subset of the training objects from the original training data are included, namely those assigned the "Moderate" and "Serious" labels of, respectively, the intermediate and minority classification sets in the original training data. Additionally, each of the selected subset of training objects included in the fine-level adapted training data is classified into whichever particular original classification set into which the training object was classified in the original training data, with, for example, those assigned the "Moderate" label in the original training data retaining the "Moderate" label in the fine-level adapted training data and those assigned the "Serious" label in the original training data retaining the "Serious" label in the fine-level adapted training data.

In the illustrated example, at the second stage 404, the training objects identified as "Description1", "Description2", and "Description3" are each assigned the "Mild" classification label in the coarse-level adapted training data by virtue of these training objects being part of the majority classification set of the original training data and the majority classification set being that represented by the "Mild" classification label. The training objects identified as "Description4", "Description5", and "Description6" are each assigned the "Not Mild" classification label in the coarse-level adapted training data by virtue of these training objects not being part of the majority classification set ("Mild") of the original training data, instead being part of either the intermediate ("Moderate") or the minority ("Serious") classification sets of the original training data. Moreover, the training objects identified as "Description1", "Description2", and "Description3" are not included in the fine-level adapted training data by virtue of these training objects being part of the majority classification set of the original training data. On the other hand, the training objects identified as "Description4" and "Description5" are each assigned the "Moderate" classification label in the fine-level adapted training data by virtue of these training objects being part of the intermediate classification set of the original training data (and thus included in the selected subset to which the fine-level training data is directed) and by virtue of these training objects being assigned the "Moderate" classification label in the original training data. Similarly, the training object identified as "Description6" is assigned the "Serious" classification label in the fine-level adapted training data by virtue of this training objects being part of the minority classification set of the original training data (and thus included in the selected subset to which the fine-level training data is directed) and by virtue of this training object being assigned the "Serious" classification label in the original training data.

At a third stage 406, example instances of a binary classification model (e.g., corresponding to and/or comprising the binary classification model 320) is shown, including a coarse-level instance of the binary classification model shown at stage 406a and a fine-level instance of the binary classification model shown at stage 406b. The example coarse-level instance of the binary classification model shown at stage 406a is configured to, for each input variable X corresponding to a (training or production) object (e.g., a description analogous to those identified in the original training data set shown with respect to the first stage 402 and those identified in the adapted training data sets shown with respect to the second stage 404), generate a corresponding output variable Z corresponding to a predicted "Severity coarse-level" label ("Mild" or "Not Mild") from the coarse-level adapted training data set shown with respect to the second stage 404. The example fine-level instance of the binary classification model shown at stage 406b is configured to, for each input variable X corresponding to a (training or production) object (e.g., a description analogous to those identified in the original training data set shown with respect to the first stage 402 and those identified in the adapted training data sets shown with respect to the second stage 404), generate a corresponding output variable Z corresponding to a predicted "Severity fine-level" label ("Moderate" or "Serious") from the fine-level adapted training data set shown with respect to the second stage 404.

At a fourth stage 408, an example binary classification hierarchy is shown, which hierarchy may be used to generate to perform binary classifications at each level and/or to combine the binary classifications from the different levels to form a multi-class classification. For example, a prediction process corresponding to a coarse-level instance of the binary classification model may be configured to perform a coarse-level binary classification of production objects from an input data set, classifying each of the production objects as either "Mild" or "Not Mild." A prediction process corresponding to a fine-level instance of the binary classification model may be configured to perform a fine-level binary classification of a selected subset of the production objects (including only those that were classified via the coarse-level instance of the binary classification model as "Not Mild"), classifying each production object of this selected subset as either "Moderate" or "Serious." Put another way, the "Not Mild" classification may represent an intermediate classification that determines which production objects are to be further classified via the fine-level instance of the binary classification model.

Having described example systems and/or apparatuses of the present disclosure, example flowcharts including various operations performed by the apparatuses and/or systems described herein will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sub-process of a second process. Additionally or alternatively, any of the processes may include some or all of the steps described and/or depicted, including one or more optional operational blocks in some embodiments. With respect to the flowcharts discussed below, one or more of the depicted blocks may be optional in some, or all, embodiments of the disclosure. Similarly, it should be appreciated that one or more of the operations of each flowchart may be combinable, replaceable, and/or otherwise altered as described herein.

FIG. 5 illustrates a flowchart including operational blocks of an example process in accordance with at least some example embodiments of the present disclosure. In some embodiments, the computer-implemented process of FIG. 5 is embodied by computer program code stored on a non-transitory computer-readable medium of a computer program product configured for execution to perform the computer-implemented method. Alternatively or additionally, in some embodiments, the example process of FIG. 5 is performed by one or more specially configured computing devices, such as the specially configured apparatus 200 (e.g., via transformation circuitry 210, training circuitry 212, classification circuitry 214, and/or integration circuitry 216). In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process of FIG. 5. In some embodiments, the specially configured apparatus 200 includes and/or otherwise is in communication with one or more external apparatuses, systems, devices, and/or the like, to perform one or more of the operations as depicted and described. While the operational blocks of the example process are depicted in FIG. 5 in a particular order, this should not be understood as requiring that such operations be performed in the particular order shown or in sequential order, or that all illustrated operations be performed.

FIG. 5 illustrates a flowchart including operational blocks of an example process 500 for performing multi-class classification using an adapted, multi-level binary classification model, in accordance with at least some example embodiments of the present disclosure.

The process 500 begins at operation 502, at which an apparatus (such as, but not limited to, the apparatus 200 or circuitry thereof as described above in connection with FIG. 2) transforms an original training data set corresponding to a multi-class classification task into at least two adapted training data sets each corresponding to a binary classification task, the at least two adapted training data sets including a coarse-level adapted training data set and at least one fine-level adapted training data set. In various embodiments, the original training data set transformed at operation 502 may correspond to and/or comprise the original training data set 310 and/or the original training data 314 as defined and described with respect to FIG. 3, the coarse-level adapted training data set into which the original training data set is transformed at operation 502 may comprise and/or correspond to the coarse-level adapted training data 318a as defined and described with respect to FIG. 3, the fine-level adapted training data set into which the original training data set is transformed at operation 502 may comprise and/or correspond to the fine-level adapted training data 318b as defined and described with respect to FIG. 3, and transforming the original training data set into the at least two adapted training data sets at operation 502 may comprise some or all of the analogous functionality attributed to the pre-classification transformation process 312 as described with respect to FIG. 3.

At operation 504 of the process 500, an apparatus (such as, but not limited to, the apparatus 200 or circuitry thereof described above in connection with FIG. 2) trains a coarse-level instance of a binary classification model configured to perform the binary classification task based at least in part on the coarse-level adapted training data set generated at operation 502 and trains each at least one fine-level instance of the binary classification model based at least in part on, respectively, each at least one fine-level adapted training data set generated at operation 502. In various embodiments, the binary classification model referenced with respect to operation 504 may correspond to and/or comprise the binary classification model 320 as defined and described with respect to FIG. 3, training the coarse-level instance of the binary classification model at operation 504 may comprise some or all of the analogous functionality attributed to the coarse-level instance 322a of the training process 322 as described with respect to FIG. 3, and training the fine-level instance of the binary classification model at operation 504 may comprise some or all of the analogous functionality attributed to the fine-level instance 322b of the training process 322 as described with respect to FIG. 3.

At operation 506 of the process 500, an apparatus (such as, but not limited to, the apparatus 200 or circuitry thereof described above in connection with FIG. 2) generates binary output data with respect to an input data set using the coarse-level instance and the at least one fine-level instance(s) of the binary classification model as trained at operation 504. In various embodiments, the binary output data generated at operation 506 may correspond to and/or comprise the binary output data 330 as defined and described with respect to FIG. 3, and generating the output data at operation 506 may comprise some or all of the analogous functionality attributed to various instances of the prediction process 324 as described with respect to FIG. 3. Additionally or alternatively, a coarse-level portion of the binary output data generated at operation 506 may correspond to and/or comprise the coarse-level binary output data 330a as defined and described with respect to FIG. 3, and generating such a coarse-level portion of the binary output data at operation 506 may comprise some or all of the analogous functionality attributed to the coarse-level instance 324a of the prediction process 324 as described with respect to FIG. 3. Additionally or alternatively, a fine-level portion of the binary output data generated at operation 506 may correspond to and/or comprise the fine-level binary output data 330b as defined and described with respect to FIG. 3, and generating such a fine-level portion of the binary output data at operation 506 may comprise some or all of the analogous functionality attributed to the fine-level instance 324b of the prediction process 324 as described with respect to FIG. 3. Additionally or alternatively, the input data set referenced with respect to operation 506 may correspond to and/or comprise the production event data 328 as defined and described with respect to FIG. 3.

At operation 508 of the process 500, an apparatus (such as, but not limited to, the apparatus 200 or circuitry thereof described above in connection with FIG. 2) transforms the binary output data generated at operation 506 into multi-class output data corresponding to the multiclass classification task. In various embodiments, the multi-class output data into which the binary output data is transformed at operation 508 may correspond to and/or comprise the multi-class output data 334 as defined and described with respect to FIG. 3, and transforming the binary output data into the multi-class output data at operation 508 may comprise some or all of the analogous functionality attributed to the post-classification transformation process 332 as described with respect to FIG. 3.

At operation 510 of the process 500, an apparatus (such as, but not limited to, the apparatus 200 or circuitry thereof described above in connection with FIG. 2) causes performance of at least one enterprise management operations based at least in part on the multi-class output data generated at operation 508. In various embodiments, the enterprise management operation(s) caused to be performed at operation 510 may correspond to and/or comprise the quality management operation(s) 336 as defined and described with respect to FIG. 3.

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. An apparatus comprising at least one processor and at least one non-transitory memory comprising program code stored thereon, wherein the at least one non-transitory memory and the program code are configured to, with the at least one processor, cause the apparatus to at least:

transform an original training data set corresponding to a multi-class classification task into at least two adapted training data sets each corresponding to a binary classification task, the at least two adapted training data sets including a coarse-level adapted training data set and at least one fine-level adapted training data set, wherein a coarse-level instance of a binary classification model configured to perform the binary classification task is trained based at least in part on the coarse-level adapted training data set, and at least one fine-level instance of the binary classification model is trained based at least in part on, respectively, each at least one fine-level adapted training data set, wherein the original training data set comprises a multi-class classification of training objects each into an original classification set of at least three original classification sets, and wherein the coarse-level adapted training data set comprises a binary classification of the training objects from the original training data set each into one of:

a majority classification set corresponding to a particular original classification set of the at least three original classification sets into which a largest proportion of the training objects are classified in the original training data set relative to other original classification sets of the at least three original classification sets; and a non-majority classification set representing a combination of the other original classification sets of the at least three original classification sets other than the particular original classification set to which the majority classification set corresponds;

transform binary output data generated with respect to an input data set using the trained coarse-level instance of the binary classification model and the trained at least one fine-level instance of the binary classification model into multi-class output data corresponding to the multiclass classification task; and cause performance of at least one enterprise management operation based at least in part on the multi-class output data.

2. The apparatus of claim 1, wherein the at least one fine-level adapted training data set each comprises a binary classification of a selected subset of the training objects, including only training objects classified into the non-majority classification set in the coarse-level adapted training data set, each into one of a first classification set and a second classification set, each of which corresponds to a different original classification set from among the combination of original classification sets represented by the non-majority classification set of the coarse-level adapted training data set.

3. The apparatus of claim 1, wherein a coarse-level portion of the binary output data, which coarse-level portion is generated using the trained coarse-level instance of the binary classification model, comprises a binary classification of all production objects from the input data set each into one of: the majority classification set and the non-majority classification set.

4. The apparatus of claim 3, wherein a fine-level portion of the binary output data, which fine-level portion is generated using the trained at least one fine-level instance of the binary classification model, comprises a binary classification of a selected subset of the production objects including only production objects classified into the non-majority classification set in the coarse-level portion of the binary output data each into a particular original classification set from among the combination of original classification sets represented by the non-majority classification set.

5. The apparatus of claim 1, wherein the at least one non-transitory memory and the program code are configured to, with the at least one processor, further cause the apparatus to at least:

train the coarse-level instance of the binary classification model based at least in part on the coarse-level adapted training data set; and train each at least one fine-level instance of the binary classification model based at least in part on, respectively, each at least one fine-level adapted training data set.

6. The apparatus of claim 1, wherein the at least one non-transitory memory and the program code are configured to, with the at least one processor, further cause the apparatus to at least:

generate the binary output data with respect to the input data set using the trained coarse-level instance of the binary classification model and the trained at least one fine-level instance of the binary classification model.

7. The apparatus of claim 6, wherein generating the binary output data and transforming the binary output data into the multi-class output data comprises:

generating a coarse-level portion of the binary output data by performing, using the trained coarse-level instance of the binary classification model, a coarse-level classification of all production objects from the input data set into one of the majority classification set and the non-majority classification set;

generating a fine-level portion of the binary output data by performing, using the trained at least one fine-level instance of the binary classification model, a fine-level classification of a selected subset of the production objects including only production objects classified into the non-majority classification set in the coarse-level portion of the binary output data; and combining the coarse-level portion of the binary output data and the fine-level portion of the binary output data to produce the multi-class output data.

8. The apparatus of claim 1, wherein the multi-class classification task includes classification of text objects containing text characterizing quality management events associated with products produced by an enterprise into classification sets corresponding to predicted levels of severity of the quality management events.

9. A computer-implemented method comprising:

transforming an original training data set corresponding to a multi-class classification task into at least two adapted training data sets each corresponding to a binary classification task, the at least two adapted training data sets including a coarse-level adapted training data set and at least one fine-level adapted training data set, wherein a coarse-level instance of a binary classification model configured to perform the binary classification task is trained based at least in part on the coarse-level adapted training data set, and at least one fine-level instance of the binary classification model is trained based at least in part on, respectively, each at least one fine-level adapted training data set, wherein the original training data set comprises a multi-class classification of training objects each into an original classification set of at least three original classification sets, and wherein the coarse-level adapted training data set comprises a binary classification of the training objects from the original training data set each into one of:
a majority classification set corresponding to a particular original classification set of the at least three original classification sets into which a largest proportion of the training objects are classified in the original training data set relative to other original classification sets of the at least three original classification sets; and
a non-majority classification set representing a combination of the other original classification sets of the at least three original classification sets other than the particular original classification set to which the majority classification set corresponds;
transforming binary output data generated with respect to an input data set using the trained coarse-level instance of the binary classification model and the trained at least one fine-level instance of the binary classification model into multi-class output data corresponding to the multiclass classification task; and
causing performance of at least one enterprise management operation based at least in part on the multi-class output data.

10. The method of claim 9, wherein the at least one fine-level adapted training data set each comprises a binary classification of a selected subset of the training objects, including only training objects classified into the non-majority classification set in the coarse-level adapted training data set, each into one of a first classification set and a second classification set, each of which corresponds to a different original classification set from among the combination of original classification sets represented by the non-majority classification set of the coarse-level adapted training data set.

11. The method of claim 9, wherein a coarse-level portion of the binary output data, which coarse-level portion is generated using the trained coarse-level instance of the binary classification model, comprises a binary classification of all production objects from the input data set each into one of: the majority classification set and the non-majority classification set.

12. The method of claim 11, wherein a fine-level portion of the binary output data, which fine-level portion is generated using the trained at least one fine-level instance of the binary classification model, comprises a binary classification of a selected subset of the production objects including only production objects classified into the non-majority classification set in the coarse-level portion of the binary output data each into a particular original classification set from among the combination of original classification sets represented by the non-majority classification set.

13. The method of claim 9, further comprising:
training the coarse-level instance of the binary classification model based at least in part on the coarse-level adapted training data set; and
training each at least one fine-level instance of the binary classification model based at least in part on, respectively, each at least one fine-level adapted training data set.

14. The method of claim 9, further comprising generating the binary output data with respect to the input data set using the trained coarse-level instance of the binary classification model and the trained at least one fine-level instance of the binary classification model.

15. The method of claim 14, wherein generating the binary output data and transforming the binary output data into the multi-class output data comprises:
generating a coarse-level portion of the binary output data by performing, using the trained coarse-level instance of the binary classification model, a coarse-level classification of all production objects from the input data set into one of the majority classification set and the non-majority classification set;
generating a fine-level portion of the binary output data by performing, using the trained at least one fine-level instance of the binary classification model, a fine-level classification of a selected subset of the production objects including only production objects classified into the non-majority classification set in the coarse-level portion of the binary output data; and
combining the coarse-level portion of the binary output data and the fine-level portion of the binary output data to produce the multi-class output data.

16. A computer program product comprising at least one non-transitory computer-readable storage medium having computer-readable program code portions stored therein, the computer-readable program code portions comprising an executable portion configured to:
transform an original training data set corresponding to a multi-class classification task into at least two adapted training data sets each corresponding to a binary classification task, the at least two adapted training data sets including a coarse-level adapted training data set and at least one fine-level adapted training data set, wherein a coarse-level instance of a binary classification model configured to perform the binary classification task is trained based at least in part on the coarse-level adapted training data set and at least one fine-level instance of the binary classification model is trained based at least in part on, respectively, each at least one fine-level adapted training data set, wherein the original training data set comprises a multi-class classification of training objects each into an original classification set of at least three original classification sets, and wherein the coarse-level adapted training data set comprises a binary classification of the training objects from the original training data set each into one of:
a majority classification set corresponding to a particular original classification set of the at least three original classification sets into which a largest proportion of the training objects are classified in the original training data set relative to other original classification sets of the at least three original classification sets; and
a non-majority classification set representing a combination of the other original classification sets of the at least three original classification sets other than the particular original classification set to which the majority classification set corresponds;
transform binary output data generated with respect to an input data set using the trained coarse-level instance of the binary classification model and the trained at least one fine-level instance of the binary classification model into multi-class output data corresponding to the multiclass classification task; and cause performance of at least one enterprise management operation based at least in part on the multi-class output data.

\* \* \* \* \*